US008705548B2

(12) United States Patent  
Meyer-Gräfe (10) Patent No.: US 8,705,548 B2  
(45) Date of Patent: Apr. 22, 2014

(54) METHOD AND APPARATUS FOR THE TRANSMISSION OF DATA VIA A BUS NETWORK USING THE BROADCAST PRINCIPLE

(75) Inventor: Karsten Meyer-Gräfe, Hövelhof (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 1145 days.

(21) Appl. No.: 10/918,970

(22) Filed: Aug. 16, 2004

(65) Prior Publication Data

US 2005/0083954 A1    Apr. 21, 2005

(30) Foreign Application Priority Data

Aug. 16, 2003    (DE) .................................. 103 37 699

(51) Int. Cl.  
H04L 12/28    (2006.01)

(52) U.S. Cl.  
USPC ............................. 370/402; 370/421; 370/257

(58) Field of Classification Search  
USPC ........................ 370/257, 365, 421, 423, 489  
See application file for complete search history.

(56) References Cited

U.S. PATENT DOCUMENTS

| 6,215,816 B1* | 4/2001 | Gillespie et al. ............... 375/219 |
| 6,282,669 B1* | 8/2001 | Imanaka et al. ................ 714/4 |
| 6,434,117 B1 | 8/2002 | Momona ....................... 370/236 |
| 6,957,115 B1* | 10/2005 | Meyer-Grafe et al. ......... 700/108 |
| 7,072,346 B2* | 7/2006 | Hama ....................... 370/395.53 |
| 7,072,803 B2* | 7/2006 | Viard et al. .................. 702/190 |
| 7,095,752 B2* | 8/2006 | Apostol et al. ................ 370/463 |
| 7,136,953 B1* | 11/2006 | Bisson et al. ................. 710/307 |
| 7,187,655 B1* | 3/2007 | Sato et al. .................... 370/252 |
| 7,206,881 B2* | 4/2007 | Cederlof et al. .............. 710/106 |
| 7,245,631 B2* | 7/2007 | Sano et al. .................... 370/463 |
| 2001/0024445 A1 | 9/2001 | Noda et al. |
| 2002/0126661 A1* | 9/2002 | Ngai .............................. 370/380 |

(Continued)

FOREIGN PATENT DOCUMENTS

| DE | 4213792 A1 * | 10/1993 | ........... G06F 13/364 |
| DE | 199 27 635 | 1/2001 | |

(Continued)

OTHER PUBLICATIONS

Office Action corresponding to Japanese Patent Application No. 2004-236352 dated May 13, 2008.

(Continued)

Primary Examiner — Ayaz Sheikh  
Assistant Examiner — Mounir Moutaouakil  
(74) Attorney, Agent, or Firm — Ohlandt, Greeley, Ruggiero & Perle, LLP (57) ABSTRACT

There is provided a method for the transmission of data via a bus network to which a plurality of subscribers are connected. The method includes a first step of transmitting data from at least one subscriber, e.g., Master, to at least another subscriber, e.g., TNx or STNx, by employing a data transmission protocol designed for point-to-point transmission. The method includes a second step of defining a broadcast message, within which selected data can be transmitted in a broadcast transmission mode, within the point-to-point transmission protocol. In a supplementary or alternative embodiment, the method includes inserting a safety broadcast message in addition to a standard or general broadcast protocol. There is also provided an apparatus for transmission of data via a bus network.

47 Claims, 5 Drawing Sheets

(56) References Cited

U.S. PATENT DOCUMENTS

2003/0002482 A1* 1/2003 Kubler et al. ............... 370/352
2003/0031209 A1* 2/2003 Regev et al. ............... 370/503
2004/0098514 A1* 5/2004 Schuster ...................... 709/253
2004/0267997 A1* 12/2004 Grzybowski et al. ........ 710/260

FOREIGN PATENT DOCUMENTS

| DE | 199 35 490 | 2/2001 | | |
| DE | 102 37 351 | 4/2003 | | |
| DE | 10155975 | 5/2003 | | |
| EP | 1050826 A1 * | 11/2000 | ............. | G06F 13/42 |
| EP | 1075110 | 2/2001 | | |
| EP | 1075110 A2 * | 2/2001 | ............ | H04L 12/403 |

OTHER PUBLICATIONS

Office action dated Jul. 5, 2010 for corresponding Japanese Patent Application No. 2004-236352.

European Search Report dated Nov. 15, 2004 for corresponding European Patent Application No. 04016902.1.

* cited by examiner

METHOD AND APPARATUS FOR THE TRANSMISSION OF DATA VIA A BUS NETWORK USING THE BROADCAST PRINCIPLE

CROSS-REFERENCE TO RELATED APPLICATION

The present application is claiming priority of German Patent Application No. 103 37 699.2, filed on Aug. 16, 2003, the content of which is herein incorporated by reference.

BACKGROUND OF THE INVENTION

1. Field of the Invention

The invention relates to a method for the transmission of data via a bus network to which a plurality of subscribers are connected, and also apparatuses and bus networks adapted for carrying out the method.

2. Description of the Related Art

In particular for applications from the field of safety technology, the recording of the data stream transmitted via a bus network is an expedient property for example in order to have access to application-specific safety-orientated input and output data in a simple manner and consequently to detect errors as early as possible and to correspondingly minimize permissible maximum reaction times.

Based on the ring system of a standard Interbus according to DIN E 19258, such data recording is appropriate at the present time only directly in or downstream of the master, since it is only at this location that all the input or output information is present for evaluation.

Furthermore, a point-to-point-based transmission method has the disadvantage that many data that are not required for the actual function, that is to say in particular the so-called overhead data, have to be transmitted individually for each subscriber, as a result of which the effectiveness of the transmission is reduced overall, which has an adverse effect on the reaction times, that is to say essentially on the time between the receipt of input data, e.g. via sensors of input components of the connected subscribers, and corresponding output data, e.g. for actuators of output components of the connected subscribers, in the safety system.

In the case of the Interbus, safety-relevant input data are transmitted e.g. by a central unit in the Interbus, which central unit is integrated in the master or else may be remote from the latter, concomitantly reading and evaluating safety-orientated data.

In contrast to the described transmission path of the input data into the central controller or a monitoring device, the outputting of safety-orientated signals imposes particular requirements, however. On the one hand, said signals are significantly smaller in number compared with the input data; on the other hand, however, the safety-orientated data that are output generally have to be able to be transmitted as rapidly as possible.

In existing safety systems, therefore, data are conventionally interchanged according to the call/response principle, in which case in present-day customary solutions a central unit or a monitoring unit transmits the safety data by the call/response method to the connected safety-orientated subscribers. However, an essential disadvantage in this case resides in the need—demonstrated above—to transmit, for each subscriber, numerous so-called overhead data that are actually redundant.

In some instances, furthermore, manipulations, for example in the Interbus data frame, are even necessary under some circumstances, the data having to be buffer-stored for such manipulations and a delay thus appearing, which leads to a further significant lengthening of the reaction time.

Other transmission systems, in particular from the field of IT, already have apparatuses for transmitting broadcast messages.

By way of example, reference shall be made in this respect to networks and communication techniques which have a common transmission medium with multiple access and dynamic assignment of the transmission medium. With the aid of the respective multiple access methods, it is possible besides pure point-to-point or unicast transmission, in which data are transmitted to a single receiver, also for information to be transmitted simultaneously to a plurality of subscribers by means of a multicast and a broadcast transmission, so that in this case the proportion of overhead data is reduced compared with a multiplicity of separate unicast transmissions.

German patent specification 199 35 490 discloses in this regard a method and also a control and data transmission system for providing a corresponding communication between a plurality of subscribers and a network which has at least one multiple access channel assigned dynamically. In this case, one of the subscribers is designed as a master and the other subscribers are designed as slaves, each subscriber being assigned a standard multiple access protocol with the capability of broadcast data transmission and a master/slave protocol entity which is superposed on the standard multiple access protocol and controls the fetching of corresponding services of the standard multiple access protocol for executing a master/slave transmission method. In accordance with the disclosure, each communication cycle comprises the steps of transmitting a synchronization message from the master to the participating slaves, at least one item of information that identifies the communication cycle being transmitted in the synchronization message, transmitting a call message from the master to a participating slave by means of a unicast call, and transmitting a response message from the slave to the master and to the rest of the participating slaves in the broadcast mode.

In accordance with the disclosure of the above patent specification, the master/slave connection method that is customary for field buses is consequently mapped onto the protocols currently to be encountered in LAN networks.

Consequently, even in existing safety systems which intrinsically already have apparatuses for transmitting broadcast messages, at least output data are conventionally transmitted according to the call/response principle.

SUMMARY OF THE INVENTION

It is an object of the invention, for the transmission of data via a bus network to which a plurality of subscribers are connected, to demonstrate a novel way, compared with the prior art, of being able to combat problems in the prior art as demonstrated above, and in particular of being able to ensure the access to selected data essentially at any desired location, or location required in an application-specific manner, in the bus network in conjunction with high transmission efficiency.

The manner in which the object is achieved according to the invention is already provided in an extremely surprising way, by the subject matters having the features of the appended independent patent claims.

Advantageous and/or preferred embodiments or developments are the subject matter of the respective dependent claims.

Consequently, for the transmission of data via a bus network to which a plurality of subscribers are connected and in which case, for each communication cycle, data are transmitted from at least one subscriber to at least one further subscriber by means of a data transmission protocol designed for point-to-point transmission the invention proposes that a broadcast message within which selected data can be transmitted in a broadcast transmission mode is defined within the point-to-point transmission protocol.

Consequently, an essential advantage consists in the fact that, by the provision according to the invention of apparatuses designed for use within a bus network with means for processing a point-to-point transmission protocol with a broadcast message defined within the protocol, it becomes possible even for information which has hitherto been transmitted by means a call to individual subscribers now also to be transmitted using a bus network designed for point-to-point transmission at a multiplicity of decentralized units. Consequently, selected data, in particular output data, can be made available and/or evaluated in an extremely flexible manner and essentially independently of location. What is more, the utilization of the broadcast message leads to a significant saving of previously required control data, thereby ensuring a significant increase in the effectiveness of the transmission, particularly in safety systems a reduction of maximum required reaction times and therefore overall a significant increase in the transmission functionality.

Consequently, in accordance with one development according to the invention, it is preferably provided that safety-relevant data, in particular safety-relevant output data, are transmitted in a practical manner in a safety field, within the broadcast message.

Particularly in the application of a master/slave-based bus network, such as, for example, the Interbus designed as a ring bus it is furthermore expediently provided that a central unit, which is preferably designed as part of a master subscriber or as a separate broadcast subscriber directly following a master subscriber, generates a protocol which, by means of the broadcast message, transmits a safety protocol to all the subscribers connected in the system.

In a supplementary or alternative application, the invention furthermore proposes inserting a safety broadcast message in addition to a standard or general broadcast protocol in the case of a data transmission method via a bus network to which a plurality of subscribers are connected and in which data are transmitted from at least one subscriber to a multiplicity of further subscribers by means of a data transmission protocol designed for broadcast transmission. Consequently, even in the case of bus systems of this type, such as, for example, a CAN or Profibus, it is possible to ensure transmission of safety-relevant data, in particular output data, with corresponding advantages compared with those mentioned above.

In an extremely expedient embodiment, for both applications according to the invention, it is furthermore preferably the case that means that safeguard the broadcast message as a whole are assigned to the means correspondingly adapted for generating such safety-relevant data within the broadcast safety protocol. This additionally significantly reduces the proportion of overhead data, in particular compared with existing safety systems which transmit data according to the call/response principle and thus with the mandatory need for a multiplicity of overhead data that are not required for the actual function.

In a further practical embodiment, it is furthermore provided that furthermore broadcast-based and/or point-to-point-based data are transmitted within the broadcast message. Consequently, it is thus possible to transmit an item of information intended for all the subscribers of the bus network jointly or a command, such as, for example, a universal "emergency exit" and/or information, commands and/or addresses that are in each case specifically allocated for selected subscribers.

Particularly in the case of a point-to-point-based data transmission within the broadcast message, it is furthermore provided that the assignment between a specific subscriber and the data allocated thereto is effected by means of an addressing of the subscriber and/or an arrangement of the data in the data stream that corresponds to the physical arrangement of the subscribers at the bus. The arrangement and magnitude of the secure data that are transmitted in the safety field according to the invention for selected subscribers, particularly preferably for all the output subscribers or subscribers with output modules, can consequently be varied extremely flexibly in an application-specific manner.

In order, in a further expedient development for the application-specific monitoring or evaluation of selective data, for data to be read out and/or to be concomitantly read in a simple manner from the broadcast message by at least one of the further connected subscribers, the latter consequently have, in a practical development, bus-subscriber-based means for the defined assignment of data to a respective subscriber, in particular in order preferably independently to extract point-to-point-base data and thus data allocated to specific subscribers.

It is furthermore advantageous that such subscribers can access data of the broadcast message in practice synchronously or successively, and that, consequently, the invention can be applied to a multiplicity of bus network types.

The reading-out and/or concomitantly reading subscribers furthermore preferably have means for carrying out error checking of read-out and/or concomitantly read data and/or an entire data stream received for each communication cycle. Thus, within the bus network, it is possible, from essentially any location, to ensure a subscriber-based decentralized safety-orientated monitoring of the bus network used in an application-specific manner and/or of the transmitted data stream for errors, which, consequently, upon detection of an error, furthermore minimizes the reaction times for carrying out a safety-orientated reaction, effected in particular independently by the concomitantly reading subscriber, for example the direct shutdown of one or a plurality of units or of an entire segment.

In order to ascertain the age of data that have in each case been newly received or read out and/or concomitantly read, in order to effect shutdown independently for example after a predetermined, in particular cycle-based worst case time has elapsed, such subscribers in an expedient embodiment, comprise a memory in which the respective time of a receipt of data can be stored, and a correspondingly designed monitoring and/or counting device.

In order furthermore to ensure that the broadcast message according to the invention or selected data embedded therein can already be utilized essentially with no fundamental alteration of existing protocols, the invention provides in an extremely expedient development, for the broadcast message to be arranged in the transmission protocol used in such a way that it occupies a precisely defined location during each communication cycle, and can consequently be found in a simple manner for the subscribers. Otherwise, the secure broadcast information is in this case expediently furthermore handled during the transmission like that of a subscriber.

In the case of the Interbus, it is thus preferably suitable to arrange the broadcast telegram directly between the loopback word and input data, so that, on the basis of the corresponding lengthening of the sum frame, consequently, through the connection of a standard protocol module and possibly supplemented by a shift register with an open output, the finding of the broadcast message is ensured in an extremely simple manner.

In particular with the use of the Interbus, it is furthermore provided in this case for a particularly simple implementation that secure broadcast information is read out and/or concomitantly read via the return line path.

The arrangement of a secure broadcast message in addition to standard broadcast information already present is effected in particular in a manner directly adjoining the latter. An evaluation and/or conversion of the secure information in safety-orientated (output) subscribers can thus be ensured essentially without any alteration of the protocol structure.

On account of the preferred defined arrangement and handling of the broadcast message as described above, it is furthermore possible, moreover, to additionally transmit standard data to be read out, that is to say in particular standard output data for connected output subscribers.

Preferably, the invention furthermore proposes in this respect designing safety-orientated subscriber apparatuses in multichannel fashion, in particular in order also to be able to ensure the transmission of additional, especially safeguarded parameter data at any time.

In a further refinement, the invention can furthermore be used in particular also in telecommunication-oriented bus systems in such a way that each connected subscriber can transmit a secure broadcast telecommunication message, which can in each case be evaluated independently by decentralized subscribers. In practical implementation, this can preferably be used in the realization of a secure Internet traffic for example between inputs and outputs without a participating central subscriber.

DESCRIPTION OF THE DRAWINGS

Further advantages of the invention emerge from the exemplary description below of preferred embodiments and with reference to the accompanying drawings.

In the drawings.

DESCRIPTION OF THE INVENTION

The exemplary description below of a preferred embodiment of the broadcast transmission according to the invention is essentially based on a safety-orientated application of the Interbus.

In principle, all the sensors and actuators are addressed in a sum frame during the input/output-oriented transmission by means of the Interbus.

Figure 3A:
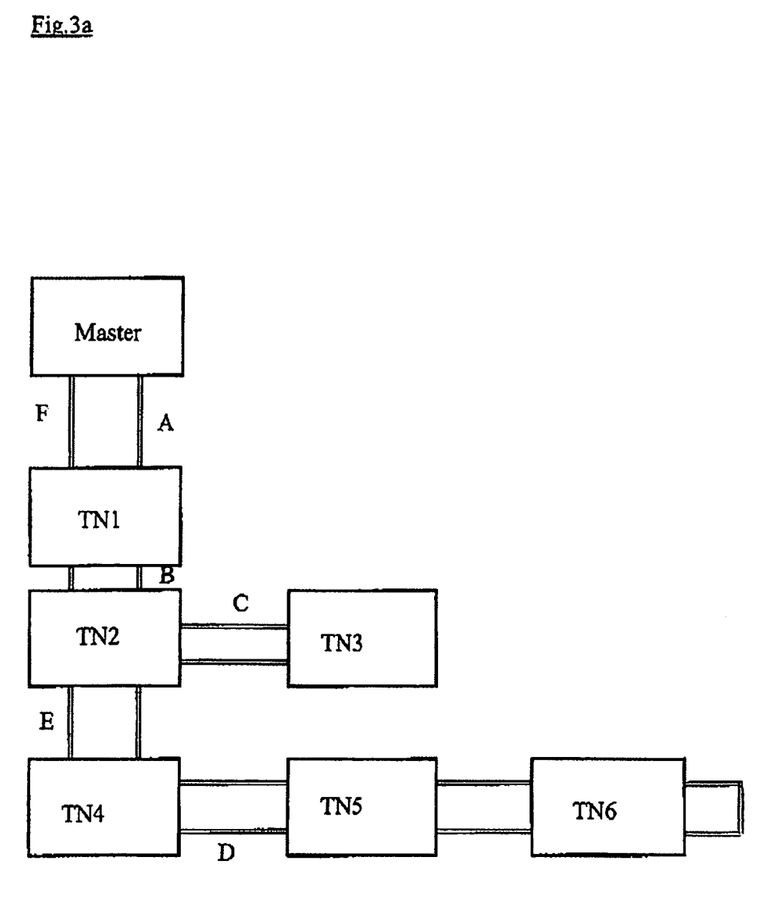
Figure 3B:
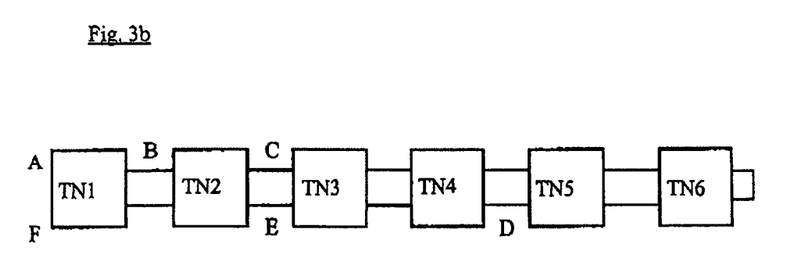

In this respect, in a schematic illustration, the appended FIGS. 3a-3b show by way of example data present in each case at interfaces of the forward and return line path of individual subscribers of such a ring system during a complete Interbus communication cycle. The figures reveal that different sum frames (FIG. 3c) are always transmitted at the incoming interfaces (FIG. 3a)—identified by the letters A, B and C—on the forward line path of the slave subscribers TN1, TN2 and TN3, respectively.

A cycle for the transmission of a data stream begins by means of the master subscriber with the transmission of the loopback word LBW, which is then followed by the current output data O6, O5, O4, O3, O2 and O1 for the individual slave subscribers TN6, TN5, TN4, TN3, TN2 and TN1, beginning with the last subscriber, that is to say in accordance with FIG. 3b, which illustrates the order of the memories of the individual subscribers, beginning with the subscriber TN6. Consequently, all the current output data of a communication cycle are present at the interface A and can thus be kept up there for evaluation by a, for example secure, monitor unit.

The data at the interface B, however, begin with the input data I1 (FIG. 3c) of the subscriber identified by TN1, since the loopback word LBW is still present at the subscriber TN1 when the latter forwards its input data to subscriber TN2. The loopback word LBW is thus followed only by the output data O6, O5, O4, O3 and O2 of the remaining subscribers TN6, TN5, TN4, TN3 and TN2, beginning with the data packet of the last subscriber TN6 in the ring. A similar observation can also be made at the interface C, with the difference that the loopback word LBW is followed only by the output data O6, O5, O4 and O3 of the remaining subscribers TN6, TN5, TN4 and TN3 and the loopback word is also additionally preceded by the input information I2 of the upstream subscriber TN2.

A very different situation prevails e.g. at the interfaces D and E on the return line of the ring system. The information transmitted here is identical for all the subscribers in the top level remote bus of an Interbus system, the input data of which are fed directly to the master on the returning transition line. Consequently, although the subscribers TN2, TN4 and TN5 are informed about the entire returning data stream which, on the return line, contains the input data I1, I2, I3, I4, I5 and I6 of all the connected subscribers TN1, TN2, TN3, TN4, TN5 and TN6 before the loopback word LBW (FIG. 3c), the subscribers TN2, TN4 and TN5 also concomitantly receive only a portion of the OUT data or output data of the master in this case.

The subscriber TN2, for example, never knows the OUT data for the subscriber TN1 because they are not passed through it at all. By contrast, it receives its input I1 immediately after the beginning of a new Interbus cycle. Only the first subscriber TN1 and the master are able, in principle, to receive both all the output data O6, O5, O4, O3, O2 and O1 via the forward line (interface A) and all the input data I1, I2, I3, I4, I5 and I6 of the connected subscribers TN1, TN2, TN3, TN4, TN5 and TN6 via the return line (interface F).

Figure 1:
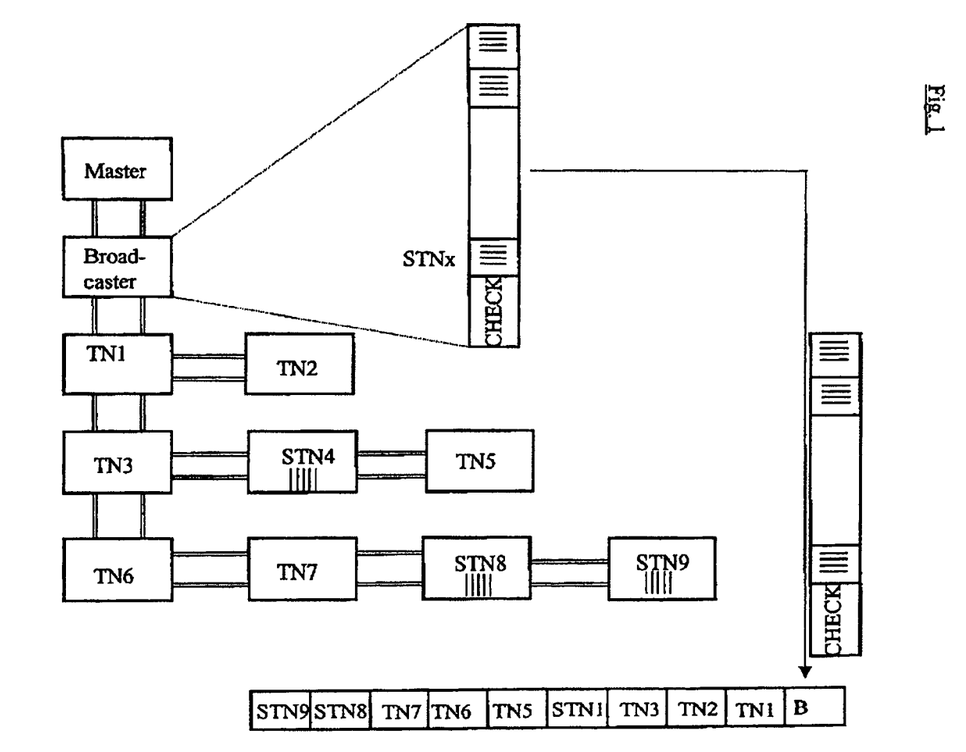
FIG. 1 shows a schematic illustration of a ring network with a broadcaster for the invention's provision and compilation of a broadcast message comprising a safety field.
Figure 2:
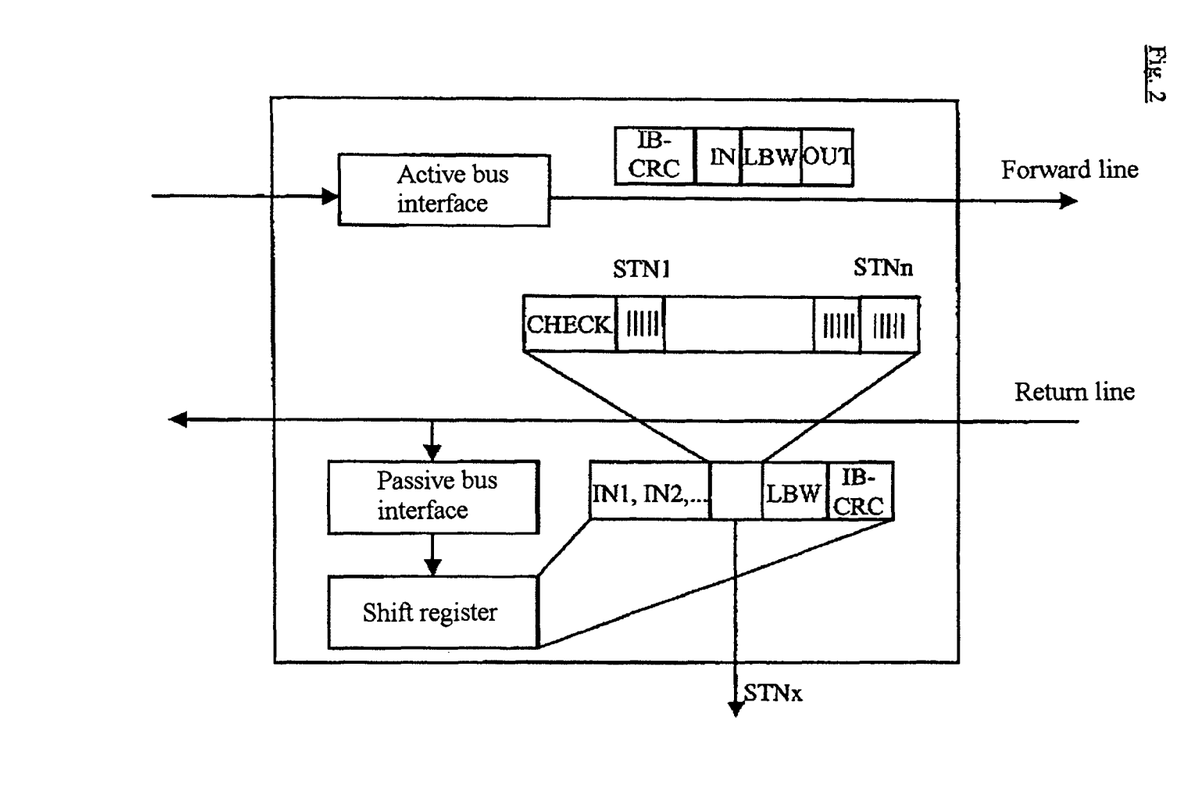
FIG. 2 shows an exemplary simplified block view of a secure subscriber that is connected to an Interbus and is designed for evaluation of a broadcast safety field in accordance with FIG. 1, FIGS. 3a-3c show a generalized schematic illustration of an Interbus ring network for illustrating data present at interfaces of individual subscribers during the data transmission of a communication cycle, and FIG. 4a schematically shows the proportion of overhead data in the case of a telecommunication-oriented data transmission compared with FIG. 4b shows a broadcast transmission.

With application of the invention, in particular with reference to FIGS. 1 and 2, a broadcast message is now concomitantly transmitted during the transmission of output data for each communication cycle, said broadcast message enabling a flexible access for selected data embedded therein. On the basis of the Interbus, the Interbus sum frame is lengthened by a broadcast message.

Figure 4A:
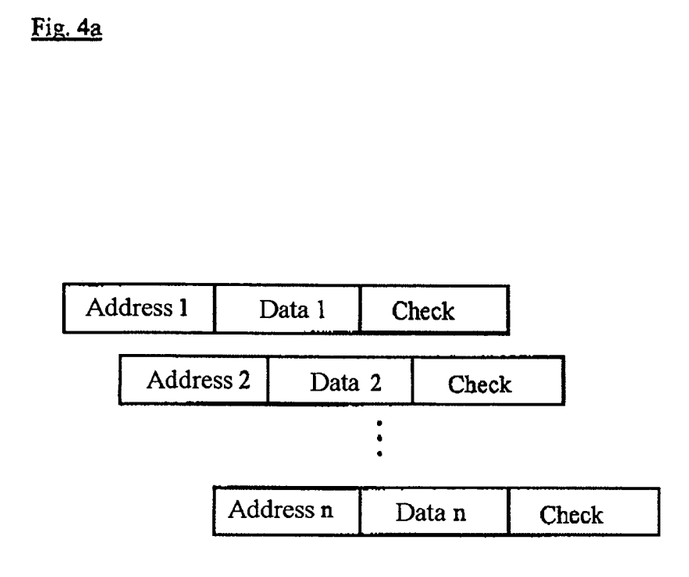
Figure 4B:
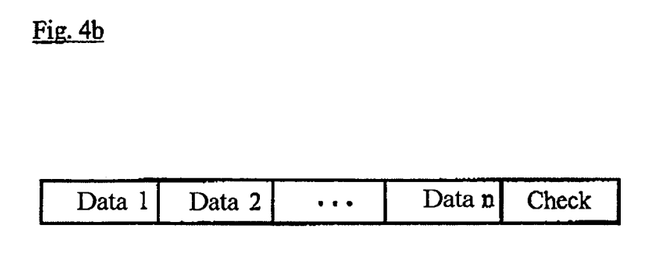

Particularly in the case of a safety-orientated application, the broadcast message consequently preferably comprises a safety field containing all the safety data. The data of a broadcast transmission, as can be seen from FIG. 4b, furthermore only has to be safeguarded once for the entire system so that the proportion of overhead data required can be significantly reduced. In order to illustrate a reduction of overhead data that is possible by means of a broadcast message, FIG. 4a shows by way of example overhead data required for a point-to-point transmission in which subscriber-related useful data are transmitted together with respectively assigned protection data check and, in the case of a telecommunication-oriented transmission, additionally with respectively assigned address data for each subscriber individually.

Taking an Interbus system as a base, according to the invention output data to be transmitted, for all the output subscribers, can furthermore be output at an identical point in time throughout the system, additional data no longer having to be provided for safety-orientated subscribers. What is more, it is furthermore possible for non-secure data, including non-secure process data and/or parameter data to continue to be constructed in the known manner e.g. by PCP (peripherals communication protocol) as in the case of standard Interbus devices.

The arrangement and the flexible evaluation of a broadcast message according to the invention, without the need for altering the data or necessarily having to use new technologies with associated technological risks, are discussed in more detail below on the basis of the safety fields outlined in FIG. 1 and FIG. 2.

FIG. 1 shows a ring bus with a master subscriber, a broadcast subscriber directly following the master, and further connected non-secure subscribers TN1, TN2, TN3, TN5, TN6, TN7 and secure subscribers STN4, STN8 and STN9. With application of the invention, in the example considered, the broadcast subscriber or broadcaster arranged downstream of the controller or the master generates a protocol which transmits a safety protocol by means of a broadcast message to all of the further connected subscribers TN1, TN2, TN3, STN4, TN5, TN6, TN7, STN8 and STN9. However, in an alternative preferred embodiment, the central unit, or subscriber unit, generating the protocol may for example also be integrated in the master.

Preferably, at least all the safety-orientated useful data for the secure subscribers STNx are embedded in the safety protocol, e.g. on the basis of nibbles or service data objects (SDO), and it acquires a special safeguard CHECK, for example in the form of a so-called cyclic redundancy check (CRC).

Depending on the bus network used, the broadcast message is incorporated within the basic point-to-point protocol in such a way that it is situated at unambiguously defined locations at predeterminable points in time or cycle segments and an access by selected subscribers is correspondingly ensured. Furthermore, the selected subscribers require the exact assignment of the useful data to the corresponding units or subscribers, which may be done, in the case of the Interbus, by means of a special address list or physical assignment and, in other buses, e.g. by means of contained or assigned addresses.

In the case of an Interbus application, the broadcast message is thus expediently arranged between the loopback word LBW and the input data and the (safety-relevant) useful data are inserted as information bits in the form of input bits in the data stream beginning with the information for the first subscriber. The information for the subsequent subscribers directly follows. The safety field in accordance with FIG. 1 consequently comprises firstly the information B assigned to the broadcast subscriber followed by the information for the rest of the subscribers, that is to say followed by the information for TN1, TN2, TN3, STN4, TN5, TN6, TN7, STN8 and STN9.

The totality of the safety-relevant information is safeguarded once, for which purpose it is possible to employ e.g. the abovementioned CRC, or else a serial number or a combination of a plurality and, if appropriate, also different suitable measures.

The connected, safety-orientated subscribers STNx (FIG. 2) selected for accessing the safety field are designed to be able to extract the bit sequence applicable to them from the received or concomitantly read data stream, which may be effected by means of the predetermined address list in the case of the Interbus. In a practical development, however, each subscriber for itself simultaneously checks all the bits received by the central unit with the same measures as the central unit and compares its result with the result of the broadcast message. In the case of the Interbus, this checking, as can be seen in FIG. 2, may also be effected on the forward line path by means of the active bus interface by the determination of a standard Interbus CRC IB-CRC.

In the case of the Interbus, the abovementioned concomitant reading may be effected in a simple manner preferably by monitoring interception on the return line, while in other bus systems the information may be read by all the subscribers at the same point in time.

On the one hand, all the information is available in the Interbus on the return line path at the end of a valid data cycle and, on the other hand, the respective safety field including the safety information (No., CRC, . . . ) carried out by the central unit can be found at a well-defined location by means of a simple shift register function in the bus system or in the sum rate.

FIG. 2 shows in this respect the way in which the data are present in the case of an Interbus system subscriber and the safety field can be concomitantly read e.g. at an essentially arbitrary safety-orientated top level output subscriber STNx for evaluation by means of the following principle.

In principle, the data are routed on the return line of an Interbus system from the last subscriber to the master without any changes directly through all the subscribers. The subscriber STNx concomitantly reads all the data by the connection of a standard protocol module and possibly supplemented by a shift register with an open output. Since, as a rule, more bits are transmitted than the protocol module and the shift register or shift registers together can acquire, the bits fall out of the subscriber unutilized until the Interbus cycle has been identified as valid. Consequently, at this point in time, only the last bits are situated in both units. These are firstly the standard Interbus CRC and the loopback word, depending on the size of the register. Directly after these the shift register holds the input data of the first subscriber, that is to say of the broadcast subscriber in accordance with FIG. 1, or the data which a central unit that generates the broadcast message permits to directly follow the loopback word LBW.

The secure broadcast information is thus preferably incorporated in the transmission protocol in the manner, otherwise of the information of a first slave subscriber. The, in particular secure, information intended for the selected subscriber or subscribers is in this case oriented to a broadcast sequence that is exactly adapted to the subscriber order, so that it suffices to define for the respective subscriber that location within the broadcast area at which a relevant item of information intended for it may be situated.

In order to ascertain the age of the new data received, each connected subscriber expediently stores the time of the last information received in a memory unit. On the basis of this, with correspondingly designed means, the subscribers may independently initiate a defined safety-orientated reaction, and in particular effect shutdown, after a predetermined worse case time has elapsed.

Since the information transmitted in the broadcast field may essentially comprise any type of information, that is to say for example individual information bits, commands, addresses, etc., the received information may consequently be used to initiate individually and/or in an application-specific manner safety-oriented functions of individual subscribers or of a group of subscribers, in particular output subscribers.

Thus, it is possible to effect, in particular in a targeted manner, a direct shutdown of a connected subscriber unit, a shutdown of a standard I/O group on the safety-oriented subscriber unit and/or the shutdown of an entire segment that may comprise a plurality of subscribers.

Since, furthermore, the output data burden the standard data stream only at the central location, and moreover only once, it is furthermore possible, in principle, for the output subscribers also to be supplied with standard output data simultaneously. For this purpose, in a practical development of the invention, the respective safety-oriented units are constructed in multichannel fashion, so that specially safeguarded parameter, programming or configuration data can be transmitted via a standard PCP interface if the data are securely generated on the central unit or a remote broadcast unit and are evaluated in a safety-orientated manner on the subscriber.

Figure 3C:
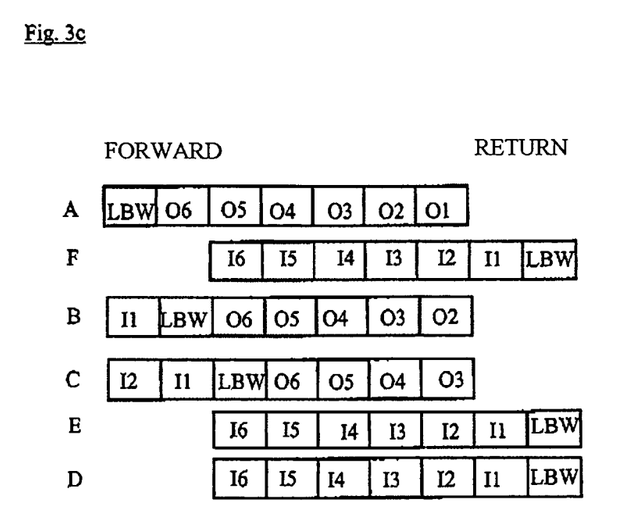

For the realization of an essentially arbitrary central broadcast unit, it is necessary, in the case of the Interbus, for a simple implementation without fundamental alterations, that the safety-orientated decentralized units are situated at the top level of the Interbus system. Furthermore, since the continuing interface from e.g. slave subscriber TN3, in accordance with FIG. 3b, constitutes the incoming interface to slave subscriber TN4, a positioning in the spur is only permitted with corresponding adaptations, since not all of the input data are present yet at this location. Only the line which, in the example in accordance with FIG. 3, downstream of the subscriber TN6, leads via TN5, TN4, TN2, TN1 back to the master contains all the input or In data of the connected subscribers. The same is similarly true for the various system levels that are possible in the Interbus.

By contrast, such problems that bring about necessary adaptations do not occur if the safety data are generated by a central unit on the Interbus master etc.

Even though the above description is essentially based on a safety-orientated application of the Interbus, the invention furthermore encompasses embodiments in which the "secure" broadcast field is inserted in addition to a standard or general broadcast protocol. By way of example in the case of a bus system, such as a CAN bus, a Profibus or an Ethernet, a broadcast safety field may be inserted into the standard broadcast information. In the case of these bus systems, too, the evaluation is effected analogously to the Interbus in the output modules for the output subscribers with corresponding modules, a broadcaster in this case corresponding to a secure controller which transmits the safety-relevant information to the safety input/output modules.

In this case, the precise position of the "secure" broadcast message may expediently be effected by insertion directly after the general broadcast, in which case the order is not mandatory and may be replaced by a respective address.

In buses of this type, too, the secure broadcast message may again essentially comprise arbitrary secure information, that is to say in particular fixedly prescribed information bits or commands. As described, the order may, in principle, be different in an application-specific manner or even arbitrary, provided that corresponding measures, such as e.g. a corresponding addressing, are taken to ensure that the selected subscribers, i.e. preferably the selected output subscribers or groups, can find the information respectively relevant to them.

Consequently, in a further configuration, it is possible that, in particular in telecommunication-orientated bus systems, each connected safety-relevant subscriber may transmit a secure broadcast message which selected decentralized (output) subscribers can each evaluate for themselves. This property can be utilized particularly when realizing a secure information Internet traffic e.g. between inputs and outputs without a participating central unit.

The assignment of the input data and the programming of the conditions which lead to the shutdown of the outputs of the safety-relevant output subscriber are to be carried out by the user in a practical manner on the central unit or the broadcaster, these not being influenced by the standard program of the SPC.

The invention claimed is:

1. A method for the transmission of data via a bus network, to which a plurality of subscribers are connected, wherein the transmission is based on a point-to-point data transmission protocol according to which data is transmitted in a pure unicast transmission mode for each subscriber individually, comprising:
    transmitting data in accordance with the point-to-point data transmission protocol in a unicast transmission mode to a single subscriber individually;
    transmitting a broadcast message to all adapted subscribers in a broadcast transmission mode by an adapted subscriber;
    reading data from the broadcast message by at least one further adapted subscriber, wherein all the adapted subscribers process the broadcast message defined within the point-to-point protocol, wherein, within the broadcast message, selected data can be transmitted to all the adapted subscribers in a broadcast transmission mode, and wherein the broadcast message is otherwise handled for a transmission of information of a defined subscriber; and
    effecting an assignment between a subscriber and data allocated thereto in the broadcast message by an arrangement of the data in a data stream that corresponds to a physical arrangement of the subscribers on the bus network.

2. The method according to claim 1, further comprising transmitting safety-relevant data within the broadcast message.

3. The method according to claim 1, further comprising:
    generating safety-relevant data within a safety protocol by a central unit; and
    transmitting said safety protocol, by employing the broadcast message to all the adapted subscribers.

4. The method according to claim 3, wherein the central unit is a part of a master subscriber, or is a broadcast subscriber directly following a master subscriber.

5. The method according to claim 3, further comprising safeguarding the safety-relevant data within the safety protocol using a CRC checksum.

6. The method according to claim 1, wherein the selected data within the broadcast message is selected from the group consisting of broadcast-based data, point-to-point-based data, and a combination thereof.

7. The method according to claim 6, wherein the reading is selected from the group consisting of concomitantly reading and reading out the data from the broadcast message by the at least one other of the plurality of subscribers on a return line.

8. The method according to claim 1, further comprising synchronously accessing the data of the broadcast message by at least another adapted subscriber.

9. The method according to claim 1, wherein at least one adapted subscriber independently extracts the data allocated to them from the broadcast message.

10. The method according to claim 1, wherein at least one adapted subscriber carries out a check of a data stream independently.

11. The method according to claim 1, wherein at least one adapted subscriber stores a time of receipt of the data.

12. The method according to claim 1, wherein at least one adapted subscriber independently carry out a safety-oriented reaction in response to the data transmitted in the broadcast message.

13. The method according to claim 1, wherein the bus network is a master/slave-based bus.

14. The method according to claim 1, wherein the bus network is a ring bus.

15. The method according to claim 1, wherein the bus network is selected from the group consisting of an Interbus, a CAN bus, a Profibus, and an Ethernet.

16. The method according to claim 1, further comprising arranging the broadcast message in a communication cycle at a location defined in the point-to-point data transmission protocol.

17. The method according to claim 16, further comprising transmitting additional data according to the standard point-to-point data transmission protocol for at least one adapted subscriber, wherein the additional data being selected from the group consisting of standard data, specially safeguarded data, and combinations thereof, and wherein the additional data and the broadcast message are transmitted simultaneously during the same communication cycle.

18. The method according to claim 1, wherein any of the adapted subscriber can transmit a secure broadcast message, which can in each case be evaluated independently by decentralized adapted subscribers.

19. An apparatus, adapted for use within a bus network, for carrying out the method as claimed in claim 1.

20. The apparatus according to claim 19, further comprising means for providing the broadcast message within the point-to-point transmission.

21. The apparatus according to claim 19, further comprising means for generating safety-relevant data within a safety protocol for transmission by the broadcast message.

22. The apparatus according to claim 19, wherein the generation means are assigned to a central unit that is part of a master subscriber or is a broadcast subscriber directly following the master subscriber.

23. The apparatus according to claim 21, further comprising means for safeguarding the safety-relevant data within the safety protocol as a whole by employment of safety information.

24. The apparatus according to claim 19, further comprising means assigned to at least one bus subscriber, selected from the group consisting of means for embedding broadcast-based data, means for embedding point-to-point-based data within the broadcast message, and combinations thereof.

25. The apparatus according to claim 19, further comprising means selected from the group consisting of means for concomitantly reading, means for reading out data from the broadcast message, and combinations thereof.

26. The apparatus according to claim 19, wherein the apparatus is adapted for use within a ring bus network.

27. The apparatus according to claim 19, wherein the apparatus is adapted for data transmission based on a bus network selected from the group consisting of an Interbus, a Profibus, a CAN bus, and an Ethernet.

28. The apparatus according to claim 26, further comprising means assigned to at least one bus subscriber, selected from the group consisting of means for concomitantly reading and means for reading out the data from the broadcast message on a return line of the ring bus network.

29. The apparatus according to claim 19, further comprising means selected from the group consisting of means for generating and means for reading out the broadcast message at a location in the communication cycle as is defined in the point-to-point data transmission protocol.

30. The apparatus according to claim 19, further comprising means assigned to a bus subscriber, for the independent extraction of data of the broadcast message that is allocated to the bus subscriber.

31. The apparatus according to claim 24, further comprising means for defining assignment of data to a subscriber.

32. The apparatus according to claim 19, further comprising means assigned to a bus subscriber, for independently checking of a received or concomitantly read data stream.

33. The apparatus according to claim 19, further comprising means assigned to a bus subscriber, selected from the group consisting of means for the storage, means for monitoring of data input times, and combinations thereof.

34. The apparatus according to claim 19, further comprising means assigned to a bus subscriber, for independent initiation of a reaction in response to data transmitted in the broadcast message.

35. The apparatus according to claim 19, further comprising at least one subscriber of multichannel design.

36. A bus network, adapted for carrying out a method as claimed in claim 1, based on a telecommunication-oriented or I/O-oriented transmission protocol.

37. The bus network according to claim 36, further comprising at least one Interbus with a transmission protocol which has a broadcast message directly between a loopback word and input data.

38. The method according to claim 1, wherein the at least one further adapted subscriber is at least one output subscriber.

39. The apparatus according to claim 19, further comprising at least one safety-oriented subscriber.

40. The method according to claim 1, wherein the bus network is an Interbus and the broadcast message is arranged within the Interbus sum frame directly between a loopback word and any input data, wherein the Interbus sum frame is lengthened by the broadcast message.

41. The method according to claim 1, wherein the bus network is an Interbus and the selected data within the broadcast message is available at any location of the bus network.

42. The method according to claim 1, wherein the broadcast message is arranged directly between a loopback word and input data.

43. A method for the transmission of data via a bus network, to which a plurality of subscribers are connected, comprising:
    transmitting a broadcast message to all adapted subscribers in a broadcast transmission mode by an adapted subscriber;
    reading data from the broadcast message by at least one other adapted subscriber, and
    wherein, within the broadcast message, selected data is, in each case, specifically allocated for selected adapted subscribers, the selected data is transmitted in addition to or substituted for broadcast-based data that is intended for all the adapted subscribers, and wherein all the adapted subscribers have means for the defined assignment of the selected data within the broadcast message to a respective subscriber; and effecting an assignment between a subscriber and data allocated thereto in the broadcast message by an arrangement of the data in a data stream that corresponds to a physical arrangement of the subscribers on the bus network.

44. The method according to claim 43, further comprising transmitting safety-relevant data within the broadcast message.

45. The method according to claim 44, further comprising safeguarding the safety-relevant data within the broadcast message once as a whole.

46. The method according to claim 45, further comprising safeguarding the safety-relevant data within the broadcast message by employment of safety information selected from the group consisting of a CRC checksum, a serial number and a combination thereof.

47. The method according to claim 43, wherein the broadcast message is arranged directly between a loopback word and input data.

* * * * *